United States Patent
Purdy et al.

(10) Patent No.: US 11,795,373 B2
(45) Date of Patent: Oct. 24, 2023

(54) CORROSION INHIBITOR FOR VARIOUS ACIDS

(71) Applicant: Dorf Ketal Chemicals FZE, Fujairah (AE)

(72) Inventors: Clay Purdy, Medicine Hat (CA); Markus Weissenberger, Calgary (CA)

(73) Assignee: Dorf Ketal Chemicals FZE, Fujairah (AE)

( * ) Notice: Subject to any disclaimer, the term of this patent is extended or adjusted under 35 U.S.C. 154(b) by 0 days.

(21) Appl. No.: 17/253,748

(22) PCT Filed: Jun. 14, 2019

(86) PCT No.: PCT/CA2019/000093
§ 371 (c)(1),
(2) Date: Dec. 18, 2020

(87) PCT Pub. No.: WO2019/241872
PCT Pub. Date: Dec. 26, 2019

(65) Prior Publication Data
US 2021/0340427 A1 Nov. 4, 2021

(30) Foreign Application Priority Data
Jun. 19, 2018 (CA) .................. CA 3008866

(51) Int. Cl.
C09K 8/54 (2006.01)
C09K 8/52 (2006.01)
C09K 8/74 (2006.01)
C23F 11/16 (2006.01)
C23F 11/04 (2006.01)
C23F 11/14 (2006.01)

(52) U.S. Cl.
CPC .............. *C09K 8/54* (2013.01); *C09K 8/52* (2013.01); *C09K 8/74* (2013.01); *C23F 11/04* (2013.01); *C23F 11/145* (2013.01); *C23F 11/162* (2013.01); *C09K 2208/32* (2013.01)

(58) Field of Classification Search
CPC ... C09K 8/52; C09K 8/54; C09K 8/74; C09K 2208/32; Y10S 507/934; Y10S 507/939
See application file for complete search history.

(56) References Cited

U.S. PATENT DOCUMENTS

| | | | |
|---|---|---|---|
| 3,936,316 A | 2/1976 | Gulla | |
| 4,599,182 A * | 7/1986 | Young | C09K 8/54 507/224 |
| 5,674,823 A | 10/1997 | Ricca et al. | |
| 8,323,417 B2 | 12/2012 | Fan et al. | |
| 8,765,021 B2 | 7/2014 | Zanetto | |
| 8,858,717 B2 | 10/2014 | Fan et al. | |
| 11,319,479 B2 | 5/2022 | Purdy et al. | |
| 2003/0004080 A1 | 1/2003 | Lunner et al. | |
| 2003/0166472 A1 | 9/2003 | Pursley et al. | |
| 2003/0181350 A1 | 9/2003 | Oliver | |
| 2004/0048769 A1 | 3/2004 | Ketelson | |
| 2006/0079424 A1 | 4/2006 | Perry | |
| 2006/0264335 A1 | 11/2006 | Penna et al. | |
| 2011/0049428 A1 | 3/2011 | Zanetto | |
| 2013/0137622 A1 | 5/2013 | Borst et al. | |
| 2013/0267446 A1 * | 10/2013 | De Wolf | C09K 8/528 507/241 |
| 2014/0284057 A1 | 9/2014 | Champagne et al. | |
| 2015/0126417 A1 | 5/2015 | Hatchman et al. | |
| 2015/0240147 A1 * | 8/2015 | Jiang | C09K 8/74 166/305.1 |
| 2015/0322757 A1 * | 11/2015 | Hatchman | C11D 3/0094 166/309 |
| 2015/0329767 A1 | 11/2015 | Vaughn et al. | |
| 2015/0344771 A1 | 12/2015 | Jiang et al. | |
| 2020/0032400 A1 | 1/2020 | Purdy et al. | |

FOREIGN PATENT DOCUMENTS

| | | |
|---|---|---|
| CA | 2903603 | 10/2014 |
| CA | 2898770 | 1/2016 |
| CA | 2925634 | 9/2017 |
| CA | 2925635 | 9/2017 |
| CA | 2937490 | 1/2018 |
| EP | 1724375 | 11/2006 |
| WO | WO 2006/113735 | 10/2006 |
| WO | WO 2013/174816 | 11/2013 |
| WO | WO 2015/002988 | 1/2015 |

OTHER PUBLICATIONS

Jayaperumal et al. "Inhibition effect of ethanolamines on oil well tubular material in hydrochloric acid," Anti-Corrosion Methods and Materials, 2000, vol. 47, No. 6, pp. 349-353.
International Search Report and Written Opinion for International (PCT) Patent Application No. PCT/CA2019/000093, dated Aug. 16, 2019, 8 pages.

* cited by examiner

*Primary Examiner* — Aiqun Li
(74) *Attorney, Agent, or Firm* — Sheridan Ross P.C.

(57) ABSTRACT

A liquid corrosion inhibitor composition for use with acid compositions for use in industrial activities, said corrosion inhibitor composition comprising: a thiourea derivative; a first type of amphoteric surfactant is selected from the group consisting of: a sultaine surfactant; a betaine surfactant; and combinations thereof; a second type of amphoteric surfactant; and a solvent.

17 Claims, No Drawings

CORROSION INHIBITOR FOR VARIOUS ACIDS

CROSS REFERENCE TO RELATED APPLICATIONS

This application is a national stage application under 35 U.S.C. 371 and claims the benefit of PCT Application No. PCT/CA2019/000093 having an international filing date of 14 Jun. 2019, which designated the United States, which PCT application claimed the benefit of Canada Patent Application No. 3,008,866 filed 19 Jun. 2018, the disclosure of each of which are incorporated herein by reference.

FIELD OF THE INVENTION

This invention relates to a novel corrosion inhibitor compositions for use with acids in performing various operations in the oil & gas industry or in other industrial applications, more specifically to the corrosion inhibitor compositions that are to be used with phosphoric acid compositions where acid sensitive components are present.

BACKGROUND OF THE INVENTION

An acid scale treatment is performed for the purpose of opening the perforations, cleaning down-hole pumps, ancillary equipment and tubulars to stimulating the flow of hydrocarbons. Typically, a service rig unit is required to pull all of the downhole equipment out of the hole prior to the acid treatment due to incompatibilities with chrome or chrome-plated rotors or other acid sensitive down hole components. It is highly advantageous to have a product that can treat scaling issues with the downhole equipment left in the well at higher temperatures for long durations, eliminating the need for an expensive workover of the well.

Some of the major challenges faced in the oil & gas industry from using hydrochloric acid in these applications include the following: extremely high levels of corrosion (which is countered for steel exposure by the addition of 'filming' type corrosion inhibitors that are typically themselves toxic and harmful to humans, the environment and equipment) reactions between acids and various types of metals can vary greatly but some metals, such as aluminum, magnesium and chrome or chrome plated, or high chrome content components such as duplex or super-duplex alloys, are very susceptible to major pitting and general metal loss effects causing immediate damage. Because chrome plated rotors and down hole pump components are common in the industry having a product that attacks calcium based scale but does not affect chrome at higher temperatures over long periods of time is highly advantageous. Hydrochloric acid also produces hydrogen chloride gas which is toxic (potentially fatal and corrosive to skin, eyes and metals. At levels above 50 ppm (parts per million) it can be Immediately Dangerous to Life and Health (IDHL). At levels from 1300-2000 ppm death can occur in 2-3 minutes. To overcome certain drawbacks of HCl, one can use modified acids such as HCl-urea, but one still requires the use of corrosion inhibitors and they are not applicable for long term, high temperature exposure to chrome-plated components such as rotors and associated components so common in the industry, in fact exposure times at higher temperatures in excess of 30 minutes can cause pitting and localized corrosion.

The inherent environmental effects (organic sterility, poisoning of wildlife etc.) of strong mineral acids, such as hydrochloric acid, in the event of an unintended or accidental release on surface or downhole into water aquifers or other sources of water are devastating. An unintended release at surface can also cause a hydrogen chloride gas cloud to be released, potentially endangering human and animal health. This is a common event at large storage sites when tanks split or leak or during road or rail transport events. Typically, if near the public, large areas need to be evacuated post event. Because of its acidic nature, hydrogen chloride gas or fumes is also corrosive, particularly in the presence of moisture.

The inability for acids and various blends of such with additives to biodegrade naturally results in expensive clean-up & reclamation costs for the operator should an unintended release occur. Moreover, the toxic fumes or vapours produced by hydrochloric acid are harmful to humans/animals and are highly corrosive and/or potentially explosive. As well, the dangers surrounding exposure by personnel handling the blending of such a corrosive/dangerous product limits their use/implementation.

Another concern is the potential for exposure incidents on locations due to high corrosion levels of acids causing storage container failures and/or deployment equipment failures i.e. coiled tubing or treatment iron failures caused by high corrosion rates (pitting, cracks, pinholes and major failures). Other concerns include: in particular, chrome-plated downhole equipment failures from corrosion causing the operator to have to execute a work-over and replace down hole pumps, drilling motors, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies, in particular chrome plated plunger rods and other fluid end chrome plated parts; the requirement of specialized equipment that is purpose built to pump acids greatly increasing the capital expenditures of operators and service companies; and the inability to source a finished product locally or very near its end use; transportation and onsite storage difficulties.

Having an alternative that requires minimal additives, is chrome and chrome plated friendly and can be deployed statically for long periods without concern of corrosion or pitting on acid sensitive components is very advantageous.

Hydrochloric acid is also very detrimental to most elastomers found in the oil & gas industry causing swelling and brittleness, such as those found in blow out preventers (BOP's)/downhole tools/packers/submersible pumps/seals/mud motors/stators etc. Having to deal with spent acid during the flow-back process is also very expensive as these acids typically are still at a low pH and remain toxic, precipitate metals and solubilized minerals. In many cases many hundreds of thousands of gallons of flow back fluid need to be flowed to tanks and transported to disposal wells or treated in an expensive recycling process. It is advantageous to have an acid blend and corrosion inhibitor package that is compatible with these common components, has advantageous properties to its effluent and is more health, safety and environmentally conscious.

Eliminating or even simply reducing the negative effects of acids while maintaining their usefulness is a struggle for the industry, especially on chrome, chrome plated and other acid sensitive surfaces or components. As the public demand for the use of cleaner/safer/greener products increases, companies are looking for alternatives that perform the required function without most of the drawbacks associated with the use of conventional mineral acids.

Hydrochloric acid is extremely corrosive on metals and in particular chrome and high chromium alloys. Phosphoric acid is very effective to remove rust and carbonate based scale, but it is an acid which also negatively affects the integrity of chrome and steel when placed in contact with it over time without the addition of an effective corrosion inhibitor additive.

Pure phosphoric acid is a white solid. It melts at a little over 42° C. into a viscous and colorless liquid which is quite viscous and colorless. The most commonly commercially available forms of phosphoric acid are aqueous solutions of 75% to 85% concentration. These solutions are colorless, odorless, viscous/syrupy, and non-volatile. Known common industrial uses of phosphoric acid includes rust removal, where iron (III) oxide is converted to ferric phosphate (FePO4). This ferric phosphate can then be manually removed.

Similarly, phosphate salt which consists of salts formed by the neutralization of phosphorous or phosphoric acid with a NaOH or KOH. Orthophosphates are phosphoric acid ($H_3PO_4$) salts, where 1, 2 or 3 of the hydrogen ions are neutralized. Neutralization with NaOH gives three sodium orthophosphates: (a) monosodium phosphate (MSP), (b) disodium phosphate (DSP) or (c) trisodium phosphate (TSP). Their solutions are buffers in the 4.6 to 12 pH range. TSP is an excellent degreaser. All will precipitate hardness ions such as calcium. Polyphosphates are polymers made from various orthophosphates by dehydration with heat. Sodium acid pyrophosphate (SAPP) is a clay deflocculant and treatment for cement contamination. For clay deflocculation, polyphosphates are limited by the temperature at which they hydrolyze back to orthophosphates, although several that performed up to 280° F. [138° C.] have been documented in the literature (see reference).

Similarly, polyphosphates (also known as pyrophosphates) are polymers made from various orthophosphates by dehydration with heat. Orthophosphates are phosphoric acid ($H_3PO_4$) salts, where 1, 2 or 3 of the hydrogen ions are neutralized. Sodium acid pyrophosphate (SAPP) is a clay deflocculant and treatment for cement contamination.

WO 2006113735 A2 teaches an aqueous acidic cleaning composition suitable for the cleaning of metal parts is constituted by urea phosphate, a surfactant, a corrosion inhibitor, and water. The corrosion inhibitor can be a phosphatizing compound such as iron phosphate, zinc phosphate, manganese phosphate, and the like.

US 20060079424 A1 teaches a composition for cleaning oxide discoloration, rust, and high temperature-related scale from stainless steel and other metals. The composition comprises a nitrogen acid salt produced by the mixture of urea and an acid and a gelling agent. The preferred nitrogen acid salt used in the composition is urea hydrochloride, which is a buffered acid cleaner. Synthetic smectite clay is the preferred thixotropic gelling agent. Both of these ingredients are non-hazardous and do not produce any toxic or corrosive fumes. The invention also includes the method of preparing the composition.

US 20040048769 A1 teaches a cleaning formulation comprising a cleaning agent, a particulate clay material and an aqueous carrier. The formulation has a pH less than about 4.0 and is characterized by at least a 90% reduction in viscosity at 25° C. at a shear rate of up to about 0.10 s$^{-1}$. The cleaning formulation is thixotropic and has a highly desirable combination of acid stability, temperature stability, electrolyte stability and ultraviolet radiation stability.

US 20030004080 A1 teaches a long-time stable pickling agent for the removal of an oxide layer on a stainless steel after heat treatment, such as welding, which pickling agent comprises nitric acid and fillers and constitutes of a pickling paste or pickling gel to be coated on the heat treated stainless steel, or of a pickling liquid to be sprayed on the steel. According to the invention, the pickling agent also comprises urea for reduced formation of nitrous fumes when the pickling agent is used.

U.S. Pat. No. 3,936,316 teaches a process and composition for pickling metals, especially iron based metals, prior to metal finishing. A hydrohalide acid pickling solution is used which solution is characterized by the addition of urea. The urea substantially reduces, even completely eliminates, the excessive liberation of noxious and corrosive hydrohalide acid fumes normally associated with such pickling operations. It is stated that it greatly reduces the cost of the pickling operation as the consumption of acid is dramatically reduced. Moreover, there is less injury to personnel and equipment contacted with said fumes. Finally, a metal surface treated with the pickling solution of the invention is improved as there is less pitting and the surface is more active to a metal depositing solution.

US patent application no. 2003/0181350 A1 discloses a cleaning formulation comprising a cleaning agent, a particulate clay material and an aqueous carrier. In a preferred embodiment, the formulation has a pH less than about 1.0 and is characterized by: (i) at least a 90% reduction in viscosity at 25° C. at a shear rate of up to about 0.10 s$^{-1}$, and (ii) a substantially unchanged viscosity for a period of at least 60 days. The cleaning formulation is thixotropic and is said to have a highly desirable combination of acid stability, temperature stability, electrolyte stability and ultraviolet radiation stability.

More recently, Fluid Energy's patent application CA 2,925,635 teaches the use of a modified phosphoric acid composition which shows decreased corrosion in the presence of chrome. The corrosion inhibitor package includes dibutyl thiourea present in Akzo Nobel's Armohib CI-31®.

Several production operations in the oil industry expose fluids to very high temperatures (some upward of 120° C. even up to 135° C.), the compositions used in these various operations need to withstand these high temperatures without losing their overall effectiveness. These compositions must be capable of being used in operations over a wide range of temperatures while not affecting the equipment with which it comes in contact. Most solutions available in the market damage the metallurgy of down hole pumps and/or tubulars requiring a service rig to pull these items out of the hole prior to treatment of scaling issues. The present invention is adapted to provide corrosion inhibition for metals when exposed to acids at temperatures upwards of 135° C. Additionally, the inventors have developed a corrosion inhibitor which can be dissolved much more easily than components in currently commercially available corrosion inhibition packages.

Consequently, there is still a need for corrosion inhibitors for use in the oil industry which can be incorporated with acid compositions and used in a number of applications. Preferably, the corrosion inhibitor compositions according to the present invention provide sufficient protection upon exposure to chrome plated equipment such as pumps, mud motors stators, cables and tubulars which can decrease a number of the associated dangers/issues typically associated with conventional acid applications requiring the removal of these items from the wellbore by a service rig.

Moreover, it was discovered that preferred corrosion inhibitor composition according to the present invention exhibits stability for operations at elevated temperatures (above 135° C.) and therefore makes them useful in the oil and gas industry. The corrosion inhibitor composition according to the present invention can ideally be added to various acidic compositions used in downhole oilfield operations, such as: injection-disposal and production well treatments, scale removal treatments (surface and subsurface, equipment, pipelines, facilities), formation filter cake removal, tubing pickling, matrix acid squeezes and soaks, cement squeeze breakdowns, fluid pH control, and drilling cement plugs, ball drop balls without causing damage to the chrome plated components, such as rotors within the mud motors and down-hole pumps etc. By providing and acid to assist ROP (rate of penetration) in carbonate formations it will greatly reduce drill out times the operator can save substantial costs compared to drilling with a water based system in some cases.

SUMMARY OF THE INVENTION

The corrosion inhibitor compositions according to the present invention have been developed for the oil & gas industry and other industries that utilize, in particular, phosphoric acid and its associated applications, by targeting the problems of chrome and steel corrosion, logistics/handling, human/environmental exposure and formation/fluid compatibilities.

The present invention provides a corrosion inhibitor composition which can be used over a broad range of downhole and surface applications in the oil and gas industry and which exhibit advantageous properties over known compositions. The corrosion inhibitor according to the present invention can also be used in a variety of application unrelated to the oil and gas industry, such as automotive metal treating, food processing equipment cleaning, water treatment or any industry that uses phosphoric acid that is exposed to various metals and/or other acid sensitive materials.

According to a preferred embodiment of the present invention, there is provided a corrosion inhibitor composition for use with a chrome friendly modified acid composition for use in the oil industry.

According to another preferred embodiment of the present invention, there is provided a corrosion inhibitor composition for use with a chrome-friendly modified acid composition for use in the oil industry where said modified acid composition which also provides a satisfactory protection when said modified acid composition is used on a non-chrome or chrome-plated surface.

According to another aspect of the present invention, there is provided a corrosion inhibitor composition for use with a chrome friendly modified acid composition for use in the oil industry where said modified acid composition provides a controlled and comprehensive reaction throughout a broad range of temperatures. Preferred embodiments of the present invention have reaction rates that can be controlled/retarded or greatly "slowed or increased" for specific applications where a reduced (or increased) reaction rate is an advantage simply by adjusting the amount of water blended with the product. Preferred compositions of the present invention can be diluted substantially <10%, yet still remain effective in many applications, such as scale through batch treatments or continuous injection and pH control, as well as further increasing the HSE benefits.

According to a preferred embodiment of the present invention, there is provided a corrosion inhibitor composition for use with a modified acid composition comprising urea & a phosphoric acid derivative in a molar ratio of not less than 0.1:1; preferably in a molar ratio not less than 0.5:1, preferably in a molar ratio not less than 0.7:1, more preferably in a molar ratio not less than 1.0:1; wherein the corrosion inhibitor comprises a thiourea compound, preferably diethyl thiourea. The ratio of urea:phosphoric acid can range from 0.1:1.0 to 1.0:1.0, preferably from 0.5:1.0 to 1.0:1.0, more preferably from 0.7:1.0 to 1.0:1.0.

According to a preferred embodiment, the phosphoric acid derivative is selected from the group consisting of: phosphoric acid, polyphosphoric acid, Orthophosphoric acid $(H_3PO_4)$, pyrophosphoric acid $(H_4P_2O_7)$, tripolyphosphoric acid $(H_5P_3O_{10})$, tetrapolyphosphoric acid $(H_6P_4O_{13})$, trimetaphosphoric acid $(H_3P_3O_9)$, and Phosphoric anhydride $(P_4O_{10})$. The preferred phosphoric acid derivative is ortho-phosphoric acid.

According to a preferred embodiment of the present invention, the corrosion inhibition package comprises a surfactant which is environmentally friendly. More preferably, the surfactant is capable of withstanding exposure to temperatures of up to least 130° C. for a period of 2 to 4 hours in a closed environment without undergoing degradation.

Preferably, the betaine surfactant is an amido betaine surfactant. More preferably, the amido betaine surfactant is selected from the group consisting of: an amido betaine comprising a hydrophobic tail from C8 to C16. Most preferably, the amido betaine comprising a hydrophobic tail from C8 to C16 is cocamidobetaine.

A preferred embodiment can refer to a corrosion inhibition package comprising cocamidopropyl betaine and β-Alanine, N-(2-carboxyethyl)-N-dodecyl-, sodium salt (1:1).

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to a preferred embodiment of the present invention, there is provided a liquid corrosion inhibitor composition for use with a chrome-friendly modified acid composition for use in downhole oil industry activities, said corrosion inhibitor composition comprising:
 a thiourea derivative;
 a first type of amphoteric surfactant is selected from the group consisting of: a sultaine surfactant; a betaine surfactant; and combinations thereof;
 a second type of amphoteric surfactant; and
 a solvent.

Preferably, the thiourea derivative is 1,3 diethyl-2-thiourea. Preferably also, the sultaine surfactant and betaine surfactant are selected from the group consisting of: an amido betaine surfactant; an amido sultaine surfactant; and combinations thereof. More preferably, the amido betaine surfactant is an amido betaine comprising a hydrophobic tail from C8 to C16. More preferably, the amido betaine comprising a hydrophobic tail from C8 to C16 is cocamidopropyl betaine.

According to a preferred embodiment, the second-type of amphoteric surfactant is beta.-Alanine, N-(2-carboxyethyl)-N-dodecyl-, sodium salt (1:1).

Preferably, the solvent is an alcohol selected from the group consisting of: methanol, ethanol and isopropanol.

According to a preferred embodiment, the thiourea derivative is present in a concentration ranging from 10 to 90% of the weight of the composition. Preferably, the thiourea derivative is present in a concentration ranging from 15 to 50% of the weight of the composition. Even more preferably, the thiourea derivative is present in a concentration ranging from 20 to 40% of the weight of the composition. Yet more preferably, the thiourea derivative is present in a concentration of approximately 30% of the weight of the composition.

According to a preferred embodiment, the betaine surfactant is present in a concentration ranging from 5 to 90% of the weight of the composition. Preferably, the betaine surfactant is present in a concentration ranging from 5 to 30% of the weight of the composition.

According to a preferred embodiment, the second surfactant is present in a concentration ranging from 5 to 90% of the weight of the composition. Preferably, the second surfactant is present in a concentration ranging from 5 to 30% of the weight of the composition.

According to a preferred embodiment, the solvent is present in a concentration ranging from 10 to 90% of the weight of the composition. Preferably, the solvent is present in a concentration ranging from 20 to 80% of the weight of the composition. More preferably, the solvent is present in a concentration ranging from 30 to 70% of the weight of the composition. Even more preferably, the solvent is present in a concentration ranging from 40 to 60% of the weight of the composition.

According to another aspect of the present invention, there is provided a corrosion inhibitor composition for use with an acid composition, said acid composition is selected from a group consisting of: HCl; HCl-urea in a molar ratio ranging from 0.1:1.0; phosphoric acid; and urea-phosphoric acid or a derivative thereof in a molar ratio of not less than 0.1:1.

According to another aspect of the present invention, there is provided a modified acid composition comprising an acid selected from the group consisting of: HCl; HCl-urea; phosphoric acid-urea and a phosphoric acid derivative; and a corrosion inhibitor composition comprising:
  a thiourea derivative;
  a betaine surfactant;
  an amphoteric surfactant; and
  a solvent.

Preferably, the modified acid composition of claim 20 where the phosphoric acid derivative is selected from the group consisting of: polyphosphoric acid, orthophosphoric acid ($H_3PO_4$), pyrophosphoric acid ($H_4P_2O_7$), tripolyphosphoric acid ($H_5P_3O_{10}$), tetrapolyphosphoric acid ($H_6P_4O_{13}$), trimetaphosphoric acid ($H_3P_3O_9$), and phosphoric anhydride ($P_4O_{10}$).

According to another aspect of the present invention, there is provided a corrosion inhibitor composition for use in the oil industry to perform an operation selected form the group consisting of: stimulate formations; to assist in reducing breakdown or injection pressures during downhole pumping operations; to treat wellbore filter cake post drilling operations; to assist in freeing stuck pipe; to descale pipelines and/or production wells; to increase injectivity rate of injection wells; to lower the pH of fluids; to remove undesirable scale in surface equipment, wells and related equipment and/or facilities; to conduct annular and bullhead squeezes & soaks; to increase effective permeability of formations; to reduce or remove wellbore skin damage; to clean perforations; to solubilize limestone, dolomite, calcite and combinations thereof; and to drill out cement plugs.

According to another aspect of the present invention, there is provided a liquid corrosion inhibitor composition for use with a chrome-friendly modified acid composition for use in industrial activities, said corrosion inhibitor composition comprising:
  a thiourea derivative;
  a first type of amphoteric surfactant is selected from the group consisting of: a sultaine surfactant; a betaine surfactant; and combinations thereof;
  a second type of amphoteric surfactant; and
  a solvent.

According to another aspect of the present invention, there is provided a composition comprising a phosphoric acid component (as described previously herein) and a corrosion inhibitor composition comprising: a thiourea derivative; a first type of amphoteric surfactant is selected from the group consisting of: a sultaine surfactant; a betaine surfactant; and combinations thereof; a second type of amphoteric surfactant; and a solvent for use in various industrial activities including, but not limited to: metal pickling metal polishing scale removal in water treatment applications; the removal of hardened cement or cement-like materials on surfaces metal surfaces including chrome and in the most preferred embodiment other "soft" metals. Another preferred embodiment of the above composition can be employed for etching concrete (thus minimizing damage to metals close to the etching site) or to remove efflorescence build up. Other uses for the above preferred composition according include: pH control; sanitizing of food, dairy and brewery equipment; and so on, these are preferably uses where chrome or chrome plated equipment is used.

When urea and a phosphoric acid derivative are used, there is a reaction that results in a urea phosphate solution with the chemical composition of $CO(NH_2)_2 \cdot H_3PO_4$, which binds the phosphate ion within the molecular structure. The low pH of urea phosphate allows Calcium, Magnesium and Phosphorus to co-exist in solution. This reaction greatly reduces the hazardous effects of the orthophosphoric acid on its own, such as the fuming effects, the hygroscopic effects, and the highly corrosive nature. When safety is sought, it is preferable to add the urea at a molar ratio greater than 1 to the moles of phosphoric acid derivative (in terms of phosphate groups). This is done in order to bind any available phosphate ions, thereby creating a safer, more stable product. Preferably, such compositions comprise 1.0 moles of urea per 1.0 moles of orthophosphoric acid. The urea also allows for a reduced rate of reaction when in the presence of carbonate-based materials. This again due to the stronger molecular or ionic bonds associated over what orthophosphoric acid traditionally displays.

Some industrial activities are listed herein below: phosphoric acid is used in numerous industries such as electroplating (as an acid metal cleaners—oxide removers); in integrated iron and steel manufacturing (as pickling acid); as a standard acid in laboratory chemicals; in machinery manufacturing and repair (as a clean wash agent); in pH regulation agents (as pH adjustor for water treatment); in printed circuit board manufacturing (in making PCB holes conductive and for outer layer etch/plate); in semiconductors (for wet chemical etching); and in welding and soldering agents (as corrosive flux ingredient).

Some advantages of urea-phosphoric acid compositions permit the end user to utilize an alternative to conventional acids that has transportation and storage advantages as well as health, safety and environmental advantages Enhancement in short/long term corrosion control is one of the key advantages of the present invention. The reduction in skin corrosiveness, the elimination of corrosive fumes during reactions, the controlled spending nature, and the high salt tolerance and the resistance to damaging chrome and chrome-plated metals and standard non-plated metals make the use of urea-phosphoric acid more desirable than phosphoric acid alone. However, even urea has limits on the corrosion prevention, which is why suitable corrosion inhibitor packages are still very much sought after in order to implement on a larger scale the use of phosphoric acid and derivatives thereof as well as modified acids of phosphoric acid.

Chrome-friendly is understood to mean that the corrosion on a standard chrome surface upon exposure of the modified acid composition is at least 50% less than the corrosion of the same type of chrome surface at a temperature of 20° C. for a period of time of 6 hours.

According to the SDS sheet of Armohib 31®, this inhibitor is said to be designed for use with phosphoric acid. It is said to contain a proprietary alkoxylated fatty amine salts (in an undisclosed % content), a proprietary alkoxylated organic acid (in an undisclosed content), and N,N'-dibutyl thiourea in an amount ranging from 20-30% by weight. This corrosion inhibitor does however not address the fuming and environmental toxicity drawbacks associated with the use of phosphoric acids, nor does it address the corrosion effect on chrome. It mainly addresses the corrosion on steel surfaces.

Example 1—Process to Prepare an Acid Composition for Use with a Corrosion Inhibitor According to a Preferred Embodiment of the Invention Start with a 50% by weight solution of urea liquor in water. Add 85% by weight solution of orthophosphoric acid and circulate until all reactions have completely ceased. Immediately add water to a desired concentration of 50%.

Table 1 lists the components of the acid composition of Example 1 comprising a corrosion inhibitor according to the present invention, including their weight percentage as compared to the total weight of the composition and the CAS numbers of each component.

TABLE 1

Formulation of Example 1

| Chemical | % Wt Composition | CAS# |
|---|---|---|
| Water | 43.95% | 7732-18-5 |
| Urea Phosphate | 56% | 4861-19-2 |

The resulting composition of Example 1 is a clear, odourless liquid having shelf-life of greater than 1 year. It has a freezing point temperature of approximately minus 30° C. and a boiling point temperature of approximately 100° C. It has a specific gravity of 1.19±0.02. It is completely soluble in water and its pH is 1. The phosphoric acid concentration of the composition of Example 1 is 17%. This is the stock solution which is used for most corrosion testing experiments set out hereinafter. This stock solution is referred to as UREA-PHOSPHORIC ACID (100%) in the corrosion tables. When diluted, for example, at 50% of the original stock solution, the composition is referred to as UREA-PHOSPHORIC ACID (50%).

The composition is classified as an irritant according to the classifications for skin tests. The composition is non-fuming and has no volatile organic compounds nor does it have any BTEX levels above the drinking water quality levels. BTEX refers to the chemicals benzene, toluene, ethylbenzene and xylene. Toxicity testing was calculated using surrogate information and the $LC_{50}$ was determined to be greater than 884 mg/kg.

A number of corrosion inhibitor compositions were investigated for protection against corrosion. They are listed in the below Table 2.

TABLE 2

Corrosion inhibitor compositions investigated

|  |  | CI-P3A | CI-P4 | CI-P5 | CI-P6 | CI-P7 |
|---|---|---|---|---|---|---|
| 1,3 Diethyl-2-thiourea | Vol % | 30% | 30% | 30% | 0% | 30% |
| Cocamidopropyl betaine | Vol % | 30% | 10% | 5% | 30% |  |
| .beta.-Alanine, N-(2-carboxyethyl)-N-dodecyl-, sodium salt (1:1 | Vol % | 10% | 10% | 5% | 10% |  |
| Isopropanol | Vol % | 30% | 50% | 60% | 60% | 70% |

The corrosion inhibitors utilized in table 2 are generally composed with isopropanol, cocamidopropyl betaine, .beta.-Alanine, N-(2-carboxyethyl)-N-dodecyl-, sodium salt (1:1) and 1,3-diethyl-2-thiourea. The solvent is measured according to the formulation. The two surfactants are then added to the solvent, followed by the active ingredient. Each component is dissolved into the solvent prior to the addition of the next chemical.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine.

Preferably, the solvent is selected from the group consisting: methanol; ethanol; and isopropanol. The most preferred solvent is isopropanol.

Corrosion Testing

The following corrosion testing outlined in the tables below for a number of different corrosion inhibition packages according to the present invention in the presence of a synthetic or modified acid composition was carried out diluted with saline water at a temperature of up to 135° C. (different temperatures were also used—there are indicated in the title of the tables) for various exposure periods. A desirable result was one where the lb/ft2 corrosion number is at or below 0.05. More preferably, that number is at or below 0.02. The results of the corrosion tests are reported below.

TABLE 3

Corrosion testing of various acidic compositions with various known and commercially available corrosion inhibition packages on J55 steel coupons having a density of 7.86 g/cc at 70° C.

| Coupon | Fluid | Additional Inhibitor | Surface Area (cm2) | Run Time (hours) | Mils/yr | mm/year | lb/ft2 |
|---|---|---|---|---|---|---|---|
| J-55 | UREA-PHOSPHORIC ACID (100%) |  | 28.922 | 6 | 12882.5865 | 327.218 | 0.361 |
| J-55 | UREA-PHOSPHORIC ACID (100%) | 0.5% CI-4A | 28.922 | 6 | 13903.8581 | 353.158 | 0.390 |
| J-55 | UREA-PHOSPHORIC ACID (100%) | 0.5% Armohib CI-28 ® | 28.922 | 6 | 3081.76734 | 78.277 | 0.086 |
| J-55 | UREA-PHOSPHORIC ACID (100%) | 0.5% Armohib CI-31 ® | 28.922 | 6 | 71.05157717 | 1.805 | 0.002 |
| J-55 | UREA-PHOSPHORIC ACID (100%) | 0.5% Cronox 242ES ® | 28.922 | 6 | 9021.780333 | 229.153 | 0.253 |
| J-55 | UREA-PHOSPHORIC ACID (100%) | 0.5% BASOCORRAM | 28.922 | 6 | 6109.171374 | 155.173 | 0.171 |
| J-55 | UREA-PHOSPHORIC ACID (100%) | 0.1% Armohib CI-31 | 28.922 | 4 | 34.51437824 | 0.877 | 0.001 |
| J-55 | UREA-PHOSPHORIC ACID (100%) | None | 28.922 | 3 | 17410.41779 | 442.225 | 0.244 |
| J-55 | UREA-PHOSPHORIC ACID (100%) | 0.05% Armohib CI-31 | 28.922 | 6 | 199.7535444 | 5.074 | 0.006 |
| J-55 | UREA-PHOSPHORIC ACID (100%) | 0.05% Armohib CI-31 | 28.922 | 24 | 91.09014476 | 2.314 | 0.010 |
| J-55 | UREA-PHOSPHORIC ACID (100%) | 0.05% Armohib CI-31 | 28.922 | 6 | 270.0465638 | 6.859 | 0.008 |
| J-55 | UREA-PHOSPHORIC ACID (100%) | 0.05% Armohib CI-31 | 28.922 | 6 | 143.6202699 | 3.648 | 0.004 |
| J-55 | UREA-PHOSPHORIC ACID (100%) | 0.2% CI-1A | 28.922 | 6 | 18155.57436 | 461.152 | 0.509 |

Where CI-1A: represents potassium iodide and CI-4A: represents propargyl alcohol

TABLE 4

Corrosion testing of various acidic compositions with various corrosion inhibition packages on steel coupons having a density of 7.86 g/cc at 70° C. for a duration of 6 hours

| Coupon | Fluid | Additional Inhibitor | Surface Area (cm2) | Mils/yr | mm/year | lb/ft2 |
|---|---|---|---|---|---|---|
| CR13 110 | UREA-PHOSPHORIC ACID (100%) | 0.05% Armohib CI-31 | 30.3225 | 5.064656721 | 0.129 | 0.0001 |
| CR13 110 | UREA-PHOSPHORIC ACID (100%) | None | 30.3225 | 7.958746276 | 0.202 | 0.0002 |
| CR13 110 | 42% Phosphoric acid |  | 30.3225 | 9.888139313 | 0.251 | 0.0003 |
| Chromed 1018CS | UREA-PHOSPHORIC ACID (100%) | None | 23.42 | 5385.142694 | 136.783 | 0.151 |
| Chromed 1018CS | 42% Phosphoric acid |  | 23.42 | 15050.35908 | 382.279 | 0.422 |
| N80 | UREA-PHOSPHORIC ACID (100%) | 0.05% Armohib CI-31 | 28.0774 | 416.2129708 | 10.572 | 0.011 |
| N80 | UREA-PHOSPHORIC ACID (100%) | 0.05% Armohib CI-31 | 28.0774 | 33129.10693 | 841.479 | 3.607 |
| J55 | UREA-PHOSPHORIC ACID (50%) | 0.125% CI-P3A | 28.922 | 85.71702727 | 2.177 | 0.002 |
| J55 | UREA-PHOSPHORIC ACID (50%) | 0.25% CI-P3A | 28.922 | 88.49840573 | 2.248 | 0.002 |
| N80 | UREA-PHOSPHORIC ACID (50%) | 0.125% CI-P3A | 28.0774 | 207.3251094 | 5.266 | 0.006 |
| N80 | UREA-PHOSPHORIC ACID (50%) | 0.25% CI-P3A | 28.0774 | 115.9041126 | 2.944 | 0.003 |
| 2507 | UREA-PHOSPHORIC ACID (50%) | 0.125% CI-P3A | 33.497 | 1.309908806 | 0.033 | 0.000 |
| 2507 | UREA-PHOSPHORIC ACID (50%) | 0.25% CI-P3A | 33.497 | 1.964863209 | 0.050 | 0.000 |
| J55 | UREA-PHOSPHORIC ACID (50%) | 0.125% CI-P4 | 28.922 | 84.19991174 | 2.139 | 0.002 |
| J55 | UREA-PHOSPHORIC ACID (50%) | 0.125% CI-P5 | 28.922 | 75.60292375 | 1.920 | 0.002 |
| J55 | UREA-PHOSPHORIC ACID (50%) | No CI | 28.922 | 8805.844223 | 223.668 | 0.247 |

TABLE 4-continued

Corrosion testing of various acidic compositions with various corrosion inhibition packages on steel coupons having a density of 7.86 g/cc at 70° C. for a duration of 6 hours

| Coupon | Fluid | Additional Inhibitor | Surface Area (cm2) | Mils/yr | mm/year | lb/ft2 |
|---|---|---|---|---|---|---|
| J55 | UREA-PHOSPHORIC ACID (50%) | 0.125% CI-P6 | 28.922 | 7797.973808 | 198.069 | 0.219 |
| J55 | UREA-PHOSPHORIC ACID (50%) | 0.125% CI-P7 | 28.922 | 100.8881825 | 2.563 | 0.003 |

TABLE 5

Corrosion testing of various acidic compositions with various corrosion inhibition packages on steel coupons having a density of 7.86 g/cc at 100° C. for a duration of 6 hours

| Coupon | Fluid | Additional Inhibitor | Surface Area (cm2) | Mils/yr | mm/year | lb/ft2 |
|---|---|---|---|---|---|---|
| N80 | UREA-PHOSPHORIC ACID (100%) | 0.05% Armohib CI-31 | 28.0774 | 1125.962874 | 28.599 | 0.031 |
| N80 | UREA-PHOSPHORIC ACID (100%) | 0.1% Armohib CI-31 | 28.0774 | 180.4978653 | 4.585 | 0.005 |

TABLE 6

Corrosion testing of various acidic compositions with various corrosion inhibition packages on steel coupons having a density of 7.86 g/cc for 6 hours at 70° C.

| Steel coupon type | Fluid | Temp (° C.) | Corrosion inhibitor | Surface area | Mils/yr | mm/year | lb/ft2 |
|---|---|---|---|---|---|---|---|
| J55 | UREA-PHOSPHORIC ACID (50%) | 70 | 0.125% CI-P3A | 28.922 | 85.71703 | 2.177 | 0.002 |
| J55 | UREA-PHOSPHORIC ACID (50%) | 70 | 0.25% CI-P3A | 28.922 | 88.49841 | 2.248 | 0.002 |
| N80 | UREA-PHOSPHORIC ACID (50%) | 70 | 0.125% CI-P3A | 28.0774 | 207.3251 | 5.266 | 0.006 |
| N80 | UREA-PHOSPHORIC ACID (50%) | 70 | 0.25% CI-P3A | 28.0774 | 115.9041 | 2.944 | 0.003 |
| 2507 | UREA-PHOSPHORIC ACID (50%) | 70 | 0.125% CI-P3A | 33.497 | 1.309909 | 0.033 | 0.000 |
| 2507 | UREA-PHOSPHORIC ACID (50%) | 70 | 0.25% CI-P3A | 33.497 | 1.964863 | 0.050 | 0.000 |
| J55 | UREA-PHOSPHORIC ACID (50%) | 70 | 0.125% CI-P4 | 28.922 | 84.19991 | 2.139 | 0.002 |
| J55 | UREA-PHOSPHORIC ACID (50%) | 70 | 0.125% CI-P5 | 28.922 | 75.60292 | 1.920 | 0.002 |
| J55 | UREA-PHOSPHORIC ACID (50%) | 70 | No CI | 28.922 | 8805.844 | 223.668 | 0.247 |
| J55 | UREA-PHOSPHORIC ACID (50%) | 70 | 0.125% CI-P6 | 28.922 | 7797.974 | 198.069 | 0.219 |
| J55 | UREA-PHOSPHORIC ACID (50%) | 70 | 0.125% CI-P7 | 28.922 | 100.8882 | 2.563 | 0.003 |
| J55 | 17% $H_3PO_4$ | 70 | 0.125% CI-P5 | 28.922 | 112.7723 | 2.864 | 0.003 |
| J55 | 17% $H_3PO_4$ | 70 | 0.125% CI-P7 | 28.922 | 91.27978 | 2.319 | 0.003 |
| J55 | $H_3PO_4$ same conc. As 50% UREA-PHOSPHORIC ACID | 70 | No CI | 28.922 | 80008.6000 | 203.418 | 0.225 |

TABLE 7

Corrosion testing of various acidic compositions with various corrosion inhibition packages on steel coupons having a density of 7.86 g/cc for 6 hours at various temperatures

| Steel coupon type | Fluid | Temp (° C.) | Corrosion inhibitor | Surface area | Mils/yr | mm/year | lb/ft2 |
|---|---|---|---|---|---|---|---|
| 2507 | UREA-PHOSPHORIC ACID (50%) | 120 | 0.125% CI-P5 | 33.497 | −0.43664 | −0.011 | 0.000 |
| 2507 | UREA-PHOSPHORIC ACID (50%) | 120 | 0.125% CI-P7 | 33.497 | 0.436636 | 0.011 | 0.000 |
| J55 | 17% $H_3PO_4$ | 120 | 0.125% CI-P5 | 28.922 | 342.6153 | 8.702 | 0.010 |
| J55 | 17% $H_3PO_4$ | 120 | 0.125% CI-P7 | 28.922 | 3397.327 | 86.292 | 0.095 |
| 2507 | 17% $H_3PO_4$ | 120 | 0.125% CI-P5 | 33.497 | −1.30991 | −0.033 | 0.000 |
| 2507 | 17% $H_3PO_4$ | 120 | 0.125% CI-P7 | 33.497 | −1.52823 | −0.039 | 0.000 |

TABLE 8

Corrosion testing of various acidic compositions with various corrosion inhibition packages on steel coupons having a density of 7.86 g/cc for 6 hours at 120° C.

| Steel coupon type | Fluid | Temp (° C.) | Corrosion inhibitor | Surface area | Mils/yr | mm/year | lb/ft2 |
|---|---|---|---|---|---|---|---|
| J55 | $H_3PO_4$ same conc. As 50% UREA-PHOSPHORIC ACID | 120 | 0.125% CI-P5 | 28.922 | 342.6153 | 8.702 | 0.010 |
| J55 | $H_3PO_4$ same conc. As 50% UREA-PHOSPHORIC ACID | 120 | 0.125% CI-P7 | 28.922 | 3397.327 | 86.292 | 0.095 |
| 2507 | $H_3PO_4$ same conc. As 50% UREA-PHOSPHORIC ACID | 120 | 0.125% CI-P5 | 33.497 | −1.30991 | −0.033 | 0.000 |
| 2507 | $H_3PO_4$ same conc. As 50% UREA-PHOSPHORIC ACID | 120 | 0.125% CI-P7 | 33.497 | −1.52823 | −0.039 | 0.000 |
| J55 | $H_3PO_4$ same conc. As 50% UREA-PHOSPHORIC ACID | 120 | 0.05% Armohib CI-31 | 28.922 | 4373.338 | 111.083 | 0.123 |
| J55 | $H_3PO_4$ same conc. As 50% UREA-PHOSPHORIC ACID | 120 | 0.125% Armohib CI-31 | 28.922 | 996.7449 | 25.317 | 0.028 |
| J55 | UREA-PHOSPHORIC ACID (50%) | 120 | 0.05% Armohib CI-31 | 28.922 | 788.3944 | 20.025 | 0.022 |
| J55 | UREA-PHOSPHORIC ACID (50%) | 120 | 0.125% Armohib CI-31 | 28.922 | 306.963 | 7.797 | 0.009 |

TABLE 9

Corrosion testing of various acidic compositions with various corrosion inhibition packages on steel coupons having a density of 7.86 g/cc for 6 hours at 135° C.

| Steel coupon type | Fluid | Temp (° C.) | Corrosion inhibitor | Surface area | Mils/yr | mm/year | lb/ft2 |
|---|---|---|---|---|---|---|---|
| J55 | $H_3PO_4$ same conc, as 50% UREA-PHOSPHORIC ACID | 135 | 0.125% Armohib CI-31 | 28.922 | 1465.028 | 37.212 | 0.041 |
| J55 | $H_3PO_4$ same conc, as 50% UREA-PHOSPHORIC ACID | 135 | 0.125% CI-P5 | 28.922 | 648.8197 | 16.480 | 0.018 |

A series of experiment as conducted in order to assess various solvent combinations in the CI package. The results reported below are the ratios (mass %) with CI-IP (current CI-P5), with CI-IP/Water, and methanol. Table 10 reports the results of the require loading as well as the corrosion inhibition with a 50% urea-phosphoric acid composition including corrosion inhibitor packages using various solvent compositions).

TABLE 10

Solvent testing as part of various corrosion inhibition packages on J55 steel coupons for 6 hours at 70° C.

| Ingredient | CI-IP | CI-IP/Water | Methanol |
|---|---|---|---|
| CI-B2 | 5.00% | 3.10% | 7.76% |
| CI-M | 5.00% | 3.10% | 7.76% |
| CI-DT | 30.00% | 18.76% | 46.96% |
| Isopropanol | 60.00% | 37.52% | — |
| Water | — | 37.52% | — |
| MeOH | — | — | 37.55% |
| % Vol. Loadings in Example 1 (for same CI-DT) | 0.0625% | 0.1010% | 0.0384% |
| Corrosion in 50% Example 1 at 70° C. for 6 hours on J55 (lb/ft$^2$) | 0.004 | 0.005 | 0.004 |

Where CI-M = Cocamidopropyl betaine and CI-B2 = .beta.-Alanine, N-(2-carboxyethyl)-N-dodecyl-, sodium salt (1:1), and DT refers to diethyl thiourea.

The above results supports the use of various solvents as well as combinations thereof including but not limited to: water, methanol, ethanol and isopropanol and combinations thereof such as isopropanol-water; isopropanol-methanol; methanol-ethanol; ethanol-water and methanol-water.

Table 11 highlights the various applications that the acid compositions employing a corrosion inhibitor according to a preferred embodiment of the present invention can, upon dilution thereof (said dilution may range from approximately 1 to 100% depending on the intended use) include, but are not limited to: injection/disposal treatments; soaks; acid washes; pipeline scale treatments, cement breakdowns or perforation cleaning; pH control; and de-scaling applications.

One advantage of the corrosion inhibitor compositions according to the present invention includes the flexibility they provide in terms of acid compositions with which they can be incorporated (or admixed). Indeed, HCl and phosphoric acids have substantially different corrosion profiles when referring to the types of metals with which they are compatible. Moreover, the corrosion inhibitor composition according to a preferred embodiment of the present invention provides protection against carbon steel metals as well as chrome or chrome-plated metals. As the oil industry uses both (and more) metals, often times within the same area of fluidic circulation it is desirable to be able to use acids which will not corrode one or the other metal, and more preferably neither.

The uses (or applications) of the compositions according to the present invention upon dilution thereof ranging from approximately 1 to 90% dilution, include, but are not limited to: injection/disposal treatments; matrix acid squeezes, soaks or bullheads; acid fracturing, acid washes; fracturing spearheads (breakdowns); pipeline scale treatments, cement breakdowns or perforation cleaning; pH control; and de-scaling applications, high temperature (up to 135° C.) cyclical steam scale treatments and steam assisted gravity drainage (SAGD) scale treatments (up to 135° C.).

As would be understood by the person skilled in the art, the methods of use generally comprise the following steps: providing a corrosion inhibitor composition according to a preferred embodiment of the present; admixing the corrosion inhibitor composition to an acidic composition; exposing a surface (such as a metal surface) to the aqueous acid composition; allowing the aqueous acid composition a sufficient period of time to act upon said surface; and optionally, removing the acid composition when the exposure time has been determined to be sufficient for the operation to be complete or sufficiently complete. Another method of use comprises: injecting the aqueous acid composition into a well and allowing sufficient time for the aqueous acid composition to perform its desired function, subsequently

TABLE 11

Applications for which acid compositions using the corrosion inhibition packages according to the present invention can be used as well as proposed dilution ranges

| Application: | Suggested Dilution: | Benefits: |
|---|---|---|
| Injection/Disposal Wells | 50-100% | Compatible with mutual solvents and solvent blends, very cost effective. |
| Squeezes & Soaks Bullhead Annular | 33%-100% | Ease of storage & handling, cost effective compared to conventional acid stimulations. Ability to leave pump equipment in wellbore. |
| Cement Break-downs | 50-100% | Higher concentrations recommended due to lower temperatures, and reduced solubility of aged cement. |
| pH Control | 0.1%-5.0% | Used in a variety of applications to adjust pH level of water based systems. |
| Liner De-Scaling, Heavy Oil | 1%-10% | Continuous injection/de-scaling of slotted liners, typically at very high temperatures. | removing the acid composition from the well to stop the acid exposure. Yet another method of use comprises: exposing the aqueous acid composition to a body of fluid (typically water) requiring a decrease in the pH and allowing sufficient exposure time for the aqueous acid composition to lower the pH to the desired level.

While the foregoing invention has been described in some detail for purposes of clarity and understanding, it will be appreciated by those skilled in the relevant arts, once they have been made familiar with this disclosure, which various changes in form and detail can be made without departing from the true scope of the invention in the appended claims.

The invention claimed is:

1. A composition for use with a chrome-friendly modified acid composition for use in downhole oil industry activities, wherein the composition consists of:
   10% to 80% by weight of a thiourea derivative;
   5% to 75% by weight of a first amphoteric surfactant selected from the group consisting of: a sultaine surfactant, a betaine surfactant, and combinations thereof;
   5% to 75% by weight of a second amphoteric surfactant; and
   10% to 80% by weight of a solvent selected from the group consisting of: water, methanol, ethanol, isopropanol, and combinations thereof,
   wherein the composition is a liquid corrosion inhibitor composition.

2. The composition according to claim 1, wherein the thiourea derivative is 1,3 diethyl-2-thiourea.

3. The liquid corrosion inhibitor composition according to claim 1, wherein the first amphoteric surfactant is selected from the group consisting of: an amido betaine surfactant; an amido sultaine surfactant; and combinations thereof.

4. The composition according to claim 3, wherein the first amphoteric surfactant is an amido betaine comprising a hydrophobic tail from C8 to C16.

5. The composition according to claim 4, wherein the first amphoteric surfactant is cocamidopropyl betaine.

6. The composition according to claim 1, wherein the second amphoteric surfactant is beta-Alanine, N-(2-carboxyethyl)-N-dodecyl-, sodium salt (1:1).

7. The composition according to claim 1, wherein the solvent is a combination selected from the group consisting of: isopropanol-water; isopropanol-methanol; methanol-ethanol; ethanol-water; and methanol-water.

8. The composition according to claim 1, wherein the thiourea derivative is present in a concentration ranging from 15% to 50% of the weight of the composition.

9. The composition according to claim 8, wherein the thiourea derivative is present in a concentration ranging from 20% to 40% of the weight of the composition.

10. The composition according to claim 1, wherein the first amphoteric surfactant is present in a concentration ranging from 5% to 30% of the weight of the composition.

11. The composition according to claim 1, wherein the second amphoteric surfactant is present in a concentration ranging from 5% to 30% of the weight of the composition.

12. The composition according to claim 1, wherein the solvent is present in a concentration ranging from 20% to 80% of the weight of the composition.

13. The composition according to claim 12, wherein the solvent is present in a concentration ranging from 30% to 70% of the weight of the composition.

14. A modified acid composition having a pH of no more than about 1 and consisting of the composition according to claim 1 and an acid composition, said acid composition is selected from the group consisting of: HCl; HCl-urea in a molar ratio ranging from 0.1:1.0; phosphoric acid; urea-phosphoric acid in a molar ratio of not less than 0.1:1; and a phosphoric acid derivative.

15. The modified acid composition of claim 14, wherein the phosphoric acid derivative is selected from the group consisting of: polyphosphoric acid, orthophosphoric acid ($H_3PO_4$), pyrophosphoric acid ($H_4P_2O_7$), tripolyphosphoric acid ($H_5P_3O_{10}$), tetrapolyphosphoric acid ($H_6P_4O_{13}$), trimetaphosphoric acid ($H_3P_3O_9$), and phosphoric anhydride ($P_4O_{10}$).

16. A modified acid composition having a pH of no more than about 1 and comprising an acid selected from the group consisting of: HCl-urea in a molar ratio ranging from 0.1:1.0, phosphoric acid-urea in a molar ratio of not less than 0.1:1, and a phosphoric acid derivative; and a composition consisting of:
   10% to 80% by weight of a thiourea derivative;
   5% to 75% by weight of a betaine surfactant;
   5% to 75% by weight of an amphoteric surfactant; and
   10% to 80% by weight of a solvent.

17. A composition for use with a chrome-friendly modified acid composition for use in downhole oil industry activities, said composition consisting of:
   1,3 diethyl-2-thiourea, present in a concentration ranging from 10% to 80% of the weight of the composition;
   a first amphoteric surfactant selected from the group consisting of: a sultaine surfactant, a betaine surfactant, and combinations thereof, present in a concentration ranging from 5% to 75% of the weight of the composition;
   a second amphoteric surfactant, present in a concentration ranging from 5% to 75% of the weight of the composition; and
   a solvent, present in a concentration ranging from 10% to 80% of the weight of the composition,
   wherein the composition is a composition.

* * * * *